(12) United States Patent
McCready

(10) Patent No.: US 7,645,132 B2
(45) Date of Patent: Jan. 12, 2010

(54) MOLD INSERT AND MOLD STACK FOR USE WITH MOLDING MACHINE

(75) Inventor: Derek Robertson McCready, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 228 days.

(21) Appl. No.: 11/851,403

(22) Filed: Sep. 7, 2007

(65) Prior Publication Data

US 2009/0068307 A1 Mar. 12, 2009

(51) Int. Cl.
*B29C 45/73* (2006.01)
(52) U.S. Cl. .................. 425/192 R; 425/526; 425/533; 425/552
(58) Field of Classification Search .................. 425/525, 425/526, 533, 547, 548, 552, 192 R
See application file for complete search history.

(56) References Cited

U.S. PATENT DOCUMENTS

| | | | | |
|---|---|---|---|---|
| 4,054,629 A | * | 10/1977 | Wang et al. .................. 264/520 |
| 4,497,624 A | * | 2/1985 | Brun et al. .................. 425/548 |
| 4,622,001 A | * | 11/1986 | Bright et al. ................. 425/549 |
| 5,582,851 A | * | 12/1996 | Hofstetter et al. ............ 425/562 |
| 5,736,173 A | * | 4/1998 | Wright et al. ................ 425/577 |
| 6,068,811 A | | 5/2000 | Koda |
| 6,079,972 A | * | 6/2000 | Gellert ........................ 425/552 |
| 6,488,881 B2 | * | 12/2002 | Gellert .................. 264/328.16 |
| 6,989,124 B2 | * | 1/2006 | Miller et al. ................. 264/318 |
| 7,234,930 B2 | | 6/2007 | Niewels et al. |
| 7,568,906 B2 | * | 8/2009 | Kmoch et al. ............... 425/547 |
| 2001/0016239 A1 | * | 8/2001 | Koch et al. .................. 428/35.7 |

FOREIGN PATENT DOCUMENTS

| | | |
|---|---|---|
| CA | 2430649 C | 6/2002 |
| CA | 2624321 A1 | 4/2007 |
| EP | 1825988 A1 | 8/2007 |
| WO | WO9846410 | * 10/1998 |
| WO | 2006047429 A1 | 5/2006 |

* cited by examiner

*Primary Examiner*—Yogendra Gupta
*Assistant Examiner*—Emmanuel S Luk
(74) *Attorney, Agent, or Firm*—Husky Intellectual Property Services

(57) ABSTRACT

Disclosed are a mold stack of a molding machine. A cavity insert is provided. The cavity insert comprises a body having: an internal surface defining, in use, at least a body portion of a molding cavity; an external surface defining, in use, at least a first portion of a cooling channel configured, in use, to direct a flow of coolant; and a mounting flange configured to support, in use, the body relative to a front face of a cavity plate, the mounting flange including a member configured to define, in use, a second portion of the cooling channel.

27 Claims, 5 Drawing Sheets

MOLD INSERT AND MOLD STACK FOR USE WITH MOLDING MACHINE

FIELD OF THE INVENTION

The present invention generally relates to, but is not limited to, molding systems, and more specifically the present invention relates to, but is not limited to, a mold insert and a mold stack for use with a molding system and the molding system incorporating same.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a clamp assembly and a mold assembly. The injection unit can be of a reciprocating screw type or of a two-stage type. The clamp assembly includes inter alia a frame, a movable platen, a fixed platen and an actuator for moving the movable platen and to apply tonnage to the mold assembly arranged between the platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

SUMMARY OF THE INVENTION

According to a first broad aspect of the present invention, there is provided a cavity insert for a mold stack of a molding machine. The cavity insert comprises a body having an internal surface defining, in use, at least a body portion of a molding cavity; an external surface defining, in use, at least a first portion of a cooling channel configured, in use, to direct a flow of coolant; and a mounting flange configured to support, in use, the body relative to a face of a cavity plate, the mounting flange including: a member configured to define, in use, a second portion of the cooling channel.

According to a second broad aspect of the present invention, there is provided a cavity insert for use in a mold stack of a molding machine. The cavity insert comprises a body having a mounting flange configured to support, in use, the body relative to a face of a cavity plate, the mounting flange defining a rear mounting extremity thereof; an internal surface defining, in use, at least a body portion of a molding cavity; and an external surface defining, in use, at least a first portion of a cooling channel configured, in use, to direct a flow of coolant, the first portion of the cooling channel, in use, projecting beyond the rear mounting extremity.

According to a third broad aspect of the present invention, there is provided a mold stack of a molding machine. The mold stack comprises a core assembly receivable, in use, in a core plate, the core assembly defining, in use, at least a core portion of a molding cavity; a gate insert receivable, in use, within a cavity plate, the gate insert defining, in use, at least a gate portion of the molding cavity; a neck ring located between the core assembly and a cavity insert, the neck ring configured to define, in use, a neck portion of the molding cavity; and the cavity insert including: a body having: a mounting flange configured to support, in use, the body relative to a face of the cavity plate, the mounting flange having a rear mounting extremity thereof; an internal surface defining, in use, at least a body portion of the molding cavity; and an external surface defining, in use, at least a first portion of a cooling channel configured, in use, to direct a flow of coolant, the first portion of the cooling channel, in use, projecting beyond the rear mounting extremity.

According to yet another broad aspect of the present invention, there is provided a mold stack of a molding machine. The mold stack comprises a core assembly receivable, in use, in a core plate, the core assembly defining, in use, at least a core portion of a molding cavity; a gate insert receivable, in use, within a cavity plate having a face; the gate insert defining, in use, at least a gate portion of the molding cavity; a neck ring located between the core assembly and a cavity insert, the neck ring configured to define, in use, a neck portion of the molding cavity; and the cavity insert including a body having an internal surface defining, in use, at least a body portion of the molding cavity; an external surface defining, in use, at least a first portion of a cooling channel configured, in use, to direct a flow of coolant; and a mounting flange configured to support, in use, the body relative to the face of the cavity plate, the mounting flange including a member configured to define, in use, a second portion of the cooling channel.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and are may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
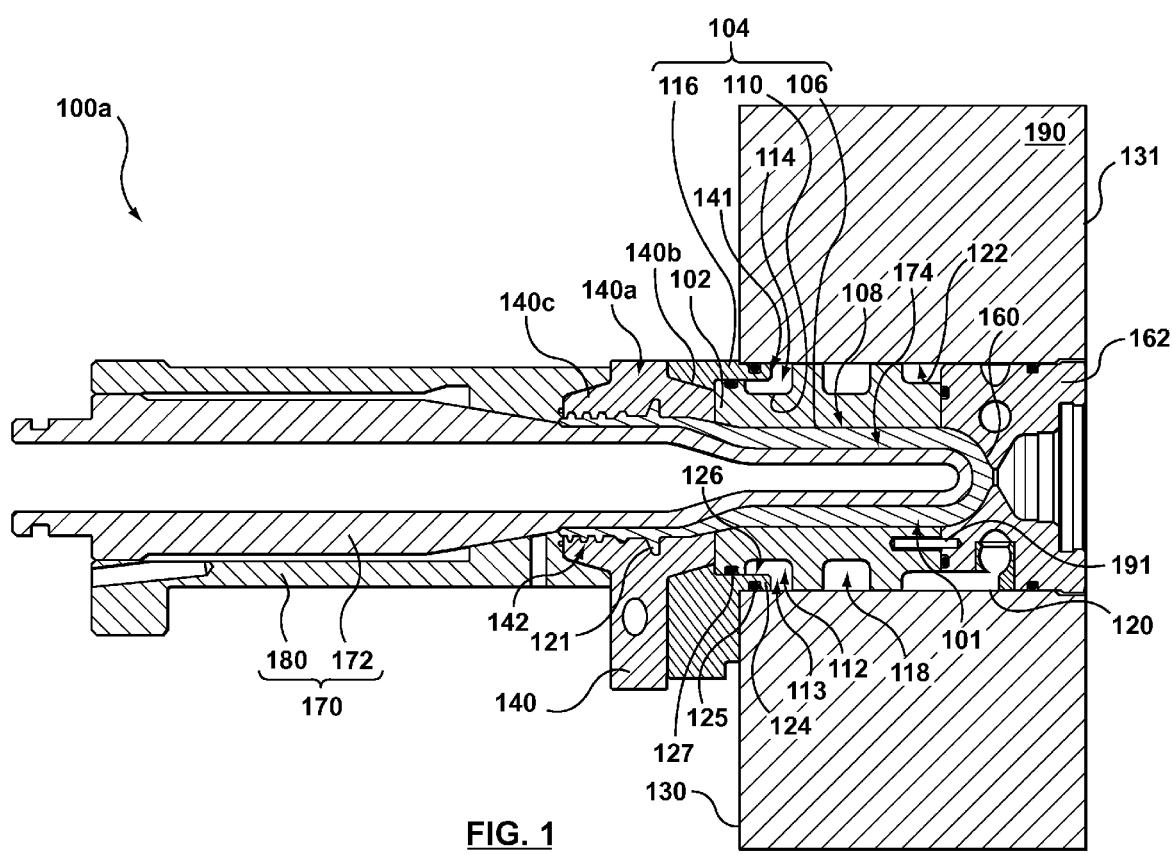
FIG. 1 is a cross-section view of a portion of a mold stack implemented according to a non-limiting embodiment of the present invention.

With reference to FIG. 1, there is depicted a portion of a mold stack 100a according to a non-limiting embodiment of the present invention. The mold stack 100a can be used as part of a molding machine (not depicted) for producing a molded article. In the specific non-limiting embodiment depicted in FIG. 1, the mold stack 100a is configured for producing a preform capable of being blow molded into a container (such as a bottle and the like), but this need not be so in every embodiment of the present invention. Accordingly, it should be understood that teachings of the embodiments of the present invention can be applied to mold stacks 100a configured to produce other types of molded articles. The mold stack 100a includes a core assembly 170, a gate insert 162, a neck ring 140, and a cavity insert 102.

The core assembly 170 is receivable, when in use, in a core plate (not depicted). The connection between the core assembly 170 and the core plate (not depicted) is well known to those of skill in the art and, as such, will not be described here at any length. Generally speaking, the purpose of the core assembly 170 is to define, when in use, at least a core portion 174 of a molding cavity 101. The structure of the core assembly 170 will be described in greater detail herein below.

The gate insert 162 is receivable, when in use, within a cavity plate 190. The connection between the gate insert 162 and the cavity plate 190 is well known to those of skill in the art and, as such, will not be described here at any length. Suffice it to state that the gate insert 162 can be coupled to the cavity plate 190 (or to the cavity insert 102) by means of suitable fasteners (such as, for example, one or more bolt with a washer or the like). The cavity plate 190 can be said to have a front face 130 and a rear face 131, located opposite of the front face 130.

The gate insert 162, receivable within a rear portion of the cavity plate 190 located between the front face 130 and the rear face 131, is configured to define, in use, at least a gate portion 160 of the molding cavity 101. The gate insert 162 is further configured to receive, in use, a nozzle (not depicted) of a molding machine (not depicted) for accepting the melt therethrough. The gate insert 162 can be associated with a sealing member (not separately numbered) for preventing coolant from leaking into the molding cavity 101. For example, as depicted in FIG. 1, a pair of O-rings (not separately numbered) associated with the gate insert 162 is provided.

In the embodiment depicted in FIG. 1, the mold stack 100a can be said to be associated with a rear portion and with a front portion (both not separately numbered). The rear portion of the mold stack 100a refers to the portion of the mold stack 100a that is proximate, in use, to a stationary platen (not depicted), which typically includes the cavity plate 190. The front portion of the mold stack 100a generally refers to the portion of the mold stack 100a that is proximate, in use, to a moveable platen (not depicted), which typically includes the aforementioned core plate (not depicted).

Located between the core assembly 170 and the cavity insert 102 is the neck ring 140. The neck ring 140 is configured to define, when in use, a neck portion 142 of the molding cavity 101 which forms the neck of a preform (not depicted). The neck ring 140, typically, consists of two complementary neck ring halves (not separately numbered), with each of the neck ring halves (not separately numbered) being supported, in use, on a respective slide (not depicted) by means of suitable fasteners (not depicted) such as bolts and the like. Slides can be actuated by known means (such as, for examples, cams) to impart lateral movement onto the neck ring halves.

The cavity insert 102 includes a body 104. The body 104 is associated with a mounting flange 116, an external surface 110 and an internal surface 106. The mounting flange 116 is configured to support, when in use, the body 104 relative to the front face 130 of the cavity plate 190 by means of suitable fasteners (not depicted), such as bolts and the like. The mounting flange 116 has a rear mounting extremity thereof, generally depicted in FIG. 1 at 141. Generally speaking, the rear mounting extremity 141 is the rear-most portion of the mounting flange 116. The internal surface 106 of the cavity insert 102 is used to define, when in use, at least a body portion 108 of the molding cavity 101.

The external surface 110 of the cavity insert 102 is used to define, when in use, at least a first portion 112 of a cooling channel 113 that is configured to direct a flow of coolant used to cool the preform formed within the molding cavity 101. The first portion 112 of the cooling channel 113 generally refers to the portion of the cooling channel 113 which is found on the extreme front of the external surface 110 of the body 104 of the cavity insert 102. Within the embodiments depicted in FIG. 1, the first portion 112 of the cooling channel 113, when in use, is projecting beyond the rear mounting extremity 141 of the mounting flange 116.

In the non-limiting embodiment depicted in FIG. 1, the mounting flange 116 further includes a member 124 that is configured to define, in use, a second portion 126 of the cooling channel 113. The member 124 further defines the aforementioned rear mounting extremity 141, wherein the first portion 112 of the cooling channel 113, in use, projects beyond the rear mounting extremity 141.

According to variants, the mounting flange 116 and the member 124 may be: (i) separately formed and then assembled together and (ii) integrally formed. Alternatively or additionally the body 104, the mounting flange 116 and the member 124 may be: (i) separately formed and then assembled together; and (ii) integrally formed.

Figure 3A:
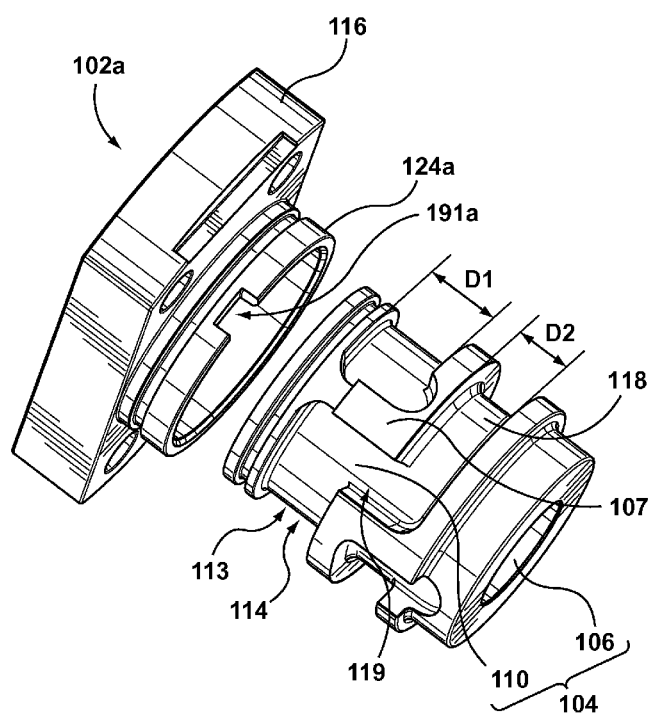
FIGS. 3A and 3B are perspective views of a cavity insert and a mounting flange of a mold stack, including a positioning member implemented according to yet another non-limiting embodiment of the present invention, in an exploded configuration and an assembled configuration, respectively.

In the non-limiting embodiment depicted in FIG. 1, the cooling channel 113 can be said to be a first cooling channel 114 and the external surface 110 is further configured to define at least a second cooling channel 118. The first cooling channel 114 and the second cooling channel 118 may be joined by a connecting channel, which is best seen in FIG. 3A and is depicted at 119.

In the non-limiting embodiment depicted in FIG. 1, the core assembly 170 includes a core 172 and a lock ring 180. The core 172 defines, when in use, the core portion 174 of the molding cavity 101 and the lock ring 180 is configured to support, when in use, the core 172 relative to the core plate (not depicted). However, those skilled in the art will appreciate that this needs not be so in every embodiments of the present invention. For example, in an alternative non-limiting embodiment of the present invention, the lock ring 180 can be omitted or may form a unitary structure with the core 172.

In the non-limiting embodiment depicted in FIG. 1, the neck ring 140 is implemented as a core lock type neck ring 140. To that extent, the neck ring includes (i) a body 140a, (ii) a first male taper 140b extending towards the rear of the mold stack 100a; and (iii) a second male taper 140c extending towards the front of the mold stack 100a. The first male taper 140b abuts with both the mounting flange 116 and the cavity insert 102, both of which together form a first female taper (not separately numbered) complementary to the first male taper 140b. The second male taper 140c abuts the lock ring 180 which forms a second female taper (not separately numbered) complementary to the second male taper 140c.

Generally speaking, the tapers (i.e. the first male taper 140b, the second male taper 140c and the associated female tapers) are dimensioned and configured to positively locate the neck ring 140 relative to the cavity insert 102. For example, the first male taper 140b and the associated female taper can be configured in an interference fit type relationship to provide for positive location of the neck ring 140 relative to the cavity insert 102. The second male taper 140c and the associated female taper can be configured in a clearance type relationship to provide for positive location of the neck ring 140 relative to the core assembly 170. Other configurations for the tapers are, of course, possible. In this non-limiting embodiment, depicted in FIG. 1, the neck ring 140 completely defines a support ledge portion 121 of the molding cavity 101.

In the non-limiting embodiment depicted in FIG. 1, the cavity plate 190 includes a receptacle 120 for receiving, when in use, the cavity insert 102, the receptacle 120 is configured to define, when in use, a third portion 122 of the cooling channel 113.

In the non-limiting embodiment depicted in FIG. 1, the member 124 can define an interface (not separately numbered) for accepting, in use, a sealing member 125. The interface (not separately numbered) is positionable, in use, between the member 124 and the cavity plate 190. Alternatively, the cavity plate 190 can define an interface (not separately numbered) for accepting, in use, a sealing member 125. The interface (not separately numbered) is positionable, in use, between the member 124 and the cavity plate 190. Furthermore, the sealing member 125 is intended to prevent coolant from leaking into the molding cavity 101 or outside of the mold stack 100a.

In the non-limiting embodiment depicted in FIG. 1, the external surface 110 defines an interface (not separately numbered) for accepting, in use, a sealing member 127. The interface (not separately numbered) is positionable, in use, between the mounting flange 116 and the external surface 110. Alternatively, the mounting flange 116 can define an interface (not separately numbered) for accepting, in use, a sealing member 127. The interface (not separately numbered) is positionable, in use, between the mounting flange 116 and the external surface 110.

In some embodiments of the present invention, the sealing member 127 and the associated interface (not depicted) can be omitted from the design of FIG. 1. This is particularly true, but is not limited, to those embodiments of the present invention, where the body 104, the mounting flange 116 and the member 124 are integrally made.

Also provided within the architecture of FIG. 1 is a positioning member 191. Generally speaking, the purpose of the positioning member 191 is to positively locate the cavity insert 102 vis-à-vis the cavity plate 190. More specifically, the positioning member 191 comprises a dowel associated with the gate insert 162 and a complementary receptacle defined in the cavity insert 102. In an alternative implementation, the dowel can be associated with the cavity insert 102 and the complementary receptacle can be defined in the gate insert 162.

Figure 2:
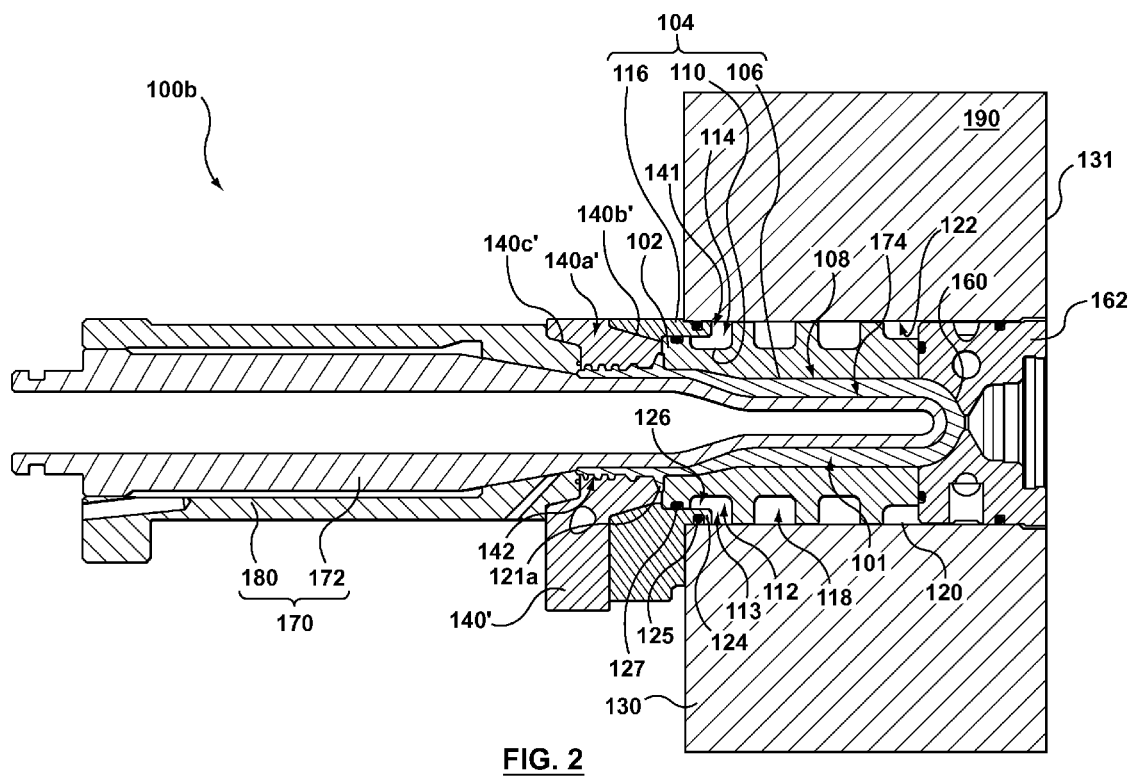
FIG. 2 is a cross-section view of a portion of a mold stack implemented according to another non-limiting embodiment of the present invention.

FIG. 2 depicts a cross-section view of a portion of a mold stack 100b according to another non-limiting embodiment of the present invention. The mold stack 100b is substantially similar to the mold stack 100a, but for the specific differences discussed herein below and, as such, like elements are depicted with like numerals. In this non-limiting embodiment, the neck ring 140 is implemented as a cavity lock type neck ring 140'. The neck ring 140' includes (i) a body 140a', (ii) a first male taper 140b' extending towards the rear of the mold stack 100b; and (iii) a first female taper 140c' defined within the body 140a' of the neck ring 140'. The first male taper 140b' abuts with both the mounting flange 116 and the cavity insert 102, both of which together form a second female taper (not separately numbered) complementary to the first male taper 140b', similar to the core lock type neck ring 140 shown in FIG. 1. The first female taper 140c' is configured to receive a lock ring 180 which forms a second male taper (not separately numbered) complementary to the first female taper 140c'. Generally speaking, the tapers (i.e. the first male taper 140b', the first female taper 140c' and the associated male/female tapers) are dimensioned and configured to positively locate the neck ring 140' relative to the cavity insert 102, as is known to those skilled in the art. In this non-limiting embodiment, depicted in FIG. 2, the neck ring 140' partially defines a support ledge portion 121a of the molding cavity 101. In other words, within this embodiment of the present invention, the support ledge portion 121a is defined partially by the neck ring 140' and partially by the cavity insert 102. Within these embodiments of the present invention, a witness line will be defined on the preform molded within the mold stack 100b.

Figure 3B:
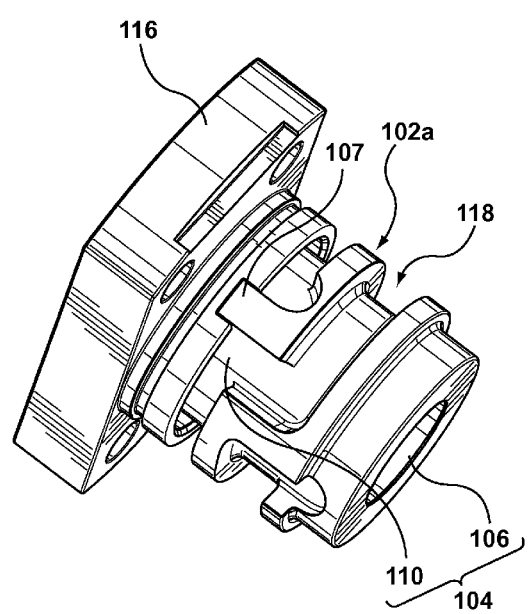

It should be noted that the implementation of the positioning member 191 depicted in FIG. 1 is but one example of how such an element can be implemented. Other alternatives are also possible. For example, with reference to FIG. 3A and FIG. 3B, which depict a cavity insert 102a according to a non-limiting embodiment of the present invention, one such alternative implementation will now be described in greater detail. In the non-limiting embodiment depicted in FIG. 3A and FIG. 3B, a member 124a includes a positioning member 191a, which in this example comprises a notch 191a that is configured to be coupled with a protrusion 107 located on the cavity insert 102a and is complementary to the notch 191a.

The protrusion 107 and the notch 191a may be configured to positively locate, when in use, the mounting flange 116 relative to the cavity insert 102a. Within these embodiments of the present invention, the mounting flange 116 can be positively located vis-à-vis the front face 130 of the cavity plate 190 by means of fasteners and the like. The purpose of positively locating the mounting flange 116 relative the cavity plate 190 and positively locating the cavity insert 102a relative to the mounting flange 116, is to ensure the cooling channel 113 is properly aligned with the cooling distribution channels (not depicted) of the cavity plate 190.

It can be said that, the notch 191a is associated with a first configuration and the protrusion 107 is associated with a second configuration; the first configuration and the second configuration is so selected such that the notch 191a fits securely within, when in use.

Figure 4:
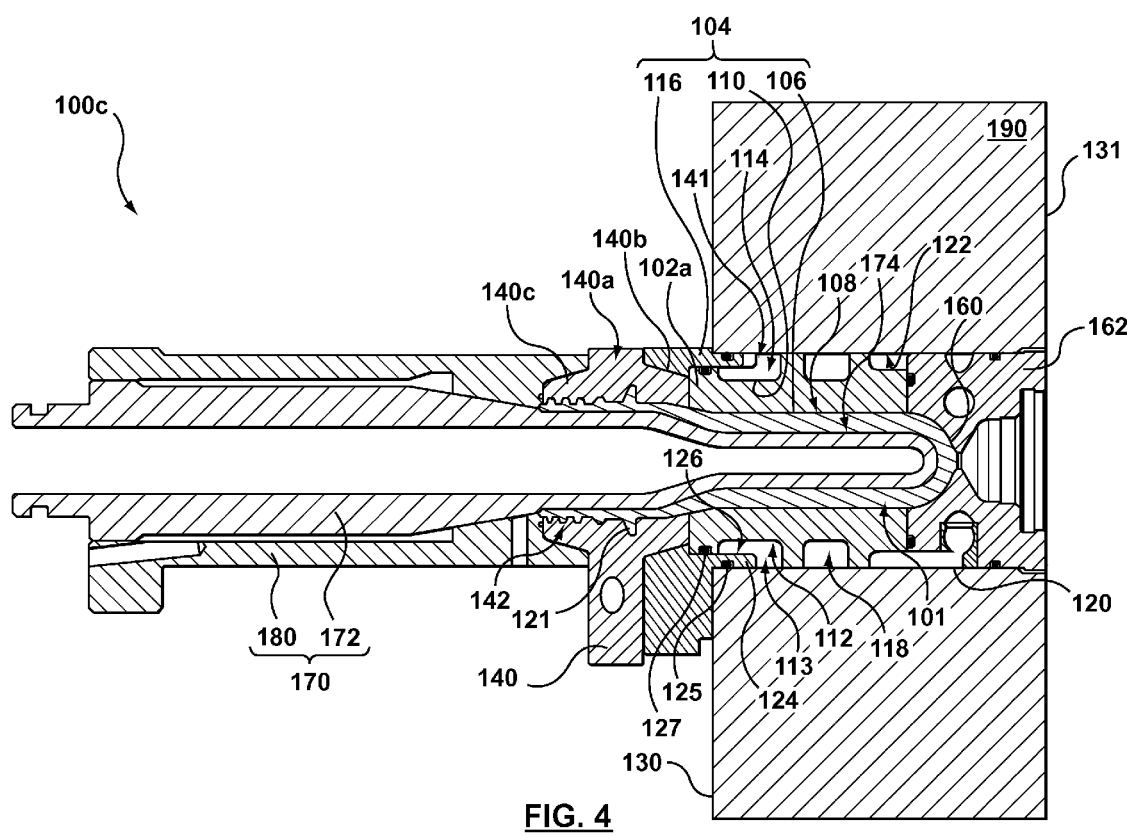
FIG. 4 is a cross-section view of the mold stack including the mold stack of FIG. 3B.

In the non-limiting embodiment depicted in FIG. 3A, the first cooling channel 114 is associated with a first depth D1 and the second cooling channel 118 is associated with a second depth D2. It can be said that the first depth D1 is greater than the second depth D2. Generally speaking, it can be said that the first cooling channel 114 is sized in order to compensate for the notch 191a and protrusion 107 interlocking-locating design. To demonstrate these embodiments of the present invention, FIG. 4 depicts a cross-section view of a mold stack 100c implemented according to a non-limiting embodiment of the present invention, the mold stack 100c incorporating the cavity insert 102a of FIG. 3A and FIG. 3B.

Figure 5:
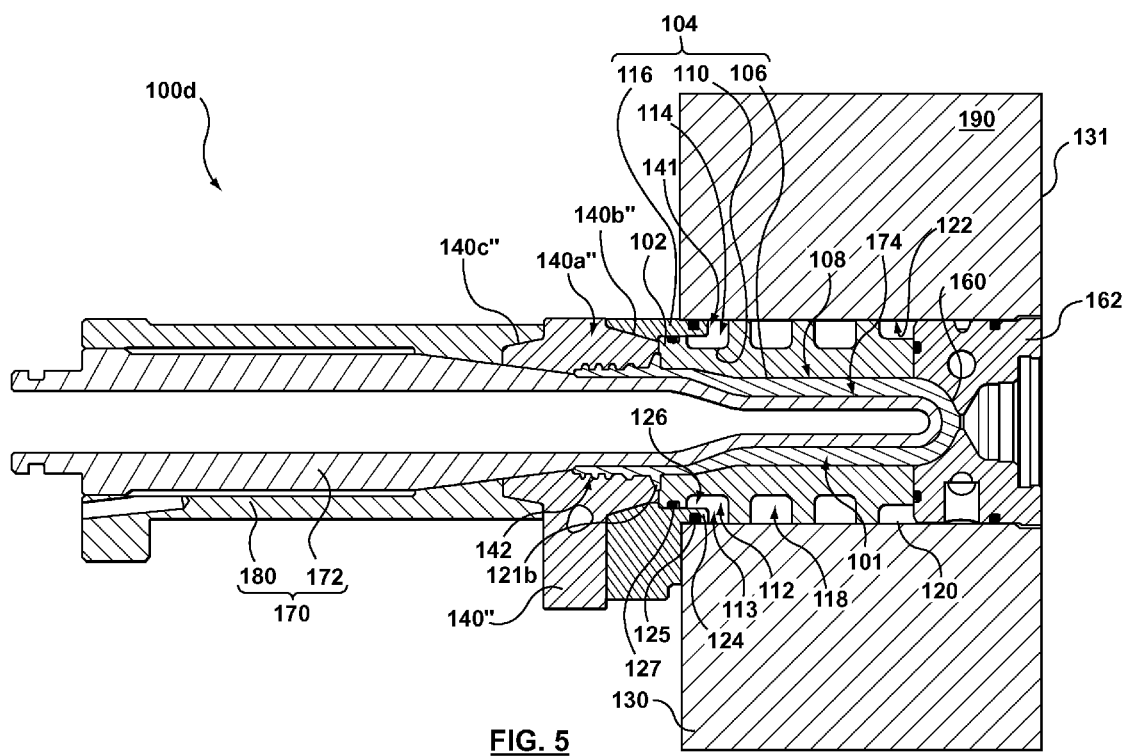
FIG. 5 is a cross-section view of a portion of a mold stack according to yet another non-limiting embodiment of the present invention.

FIG. 5 depicts a cross-section view of a portion of a mold stack 100d according to another non-limiting embodiment of the present invention. The mold stack 100d is substantially similar to the mold stack 100a, but for the specific differences discussed herein below and, as such, like elements are depicted with like numerals In this non-limiting embodiment, the neck ring 140 is implemented as a core lock type neck ring 140". The neck ring 140" includes (i) a body 140a", (ii) a first male taper 140b" extending towards the rear of the mold stack 100d; and (iii) a second male taper 140c" extending towards the front of the mold stack 100d. The first male taper 140b" abuts with both the mounting flange 116 and the cavity insert 102, both of which together form a first female taper (not separately numbered) complementary to the first male taper 140b". The second male taper 140c" abuts the lock ring 180 which forms a second female taper (not separately numbered) complementary to the second male taper 140c". Generally speaking, the tapers (i.e. the first male taper 140b", the second male taper 140c" and the associated female tapers) are dimensioned and configured to positively locate the neck ring 140" relative to the cavity insert 102.

It will be recalled that within the embodiment of FIG. 1, the support ledge portion 121 is defined exclusively by the neck ring 140". In the embodiments of FIG. 5, however, only a portion of the support ledge portion 121b is defined by the neck ring 140" and another portion of the support ledge portion 120b is defined by the cavity insert 102. Similar to the embodiments of FIG. 2, a witness line will be defined on the preform molded within the mold stack 100d.

A technical effect of the non-limiting embodiments of the present invention, amongst others, includes improved cooling efficiency in a desired region of the preforms, such as a region in proximity to a neck portion of the preform and, particularly, the cooling of the support ledge 121. Another technical effect of embodiments of the present invention may include ability to enhance cooling in the neck portion of the preform to supplement cooling provided by neck ring 140. Another technical effect of embodiments of the present invention, may include more even heat profile along the cavity insert 102. It should be expressly understood that various technical effects mentioned above need not be realized in their entirety in each and every non-limiting embodiment of the present invention.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A cavity insert for a mold stack of a molding machine, the cavity insert comprising:
   a body having:
      an internal surface defining, in use, at least a body portion of a molding cavity;
      an external surface defining, in use, at least a first portion of a cooling channel configured, in use, to direct a flow of coolant; and
      a mounting flange configured to support, in use, the body relative to a front face of a cavity plate, the mounting flange including:
         a member configured to define, in use, a second portion of the cooling channel, the member further defining a rear mounting extremity, and wherein at least a portion of the first portion of the cooling channel, in use, projects beyond the rear mounting extremity.

2. The cavity insert of claim 1, said cooling channel being a first cooling channel;
   wherein said external surface is further configured to define at least a second cooling channel.

3. The cavity insert of claim 2, wherein:
   said first cooling channel and said second cooling channel are joined by a connecting channel.

4. The cavity insert of claim 3, wherein said first cooling channel is associated with a first depth and wherein said second cooling channel is associated with a second depth; and wherein said first depth is greater than said second depth.

5. The cavity insert of claim 1, wherein:
   the cavity plate includes:
      a receptacle for receiving, in use, the cavity insert, the receptacle being configured to define, in use, a third portion of the cooling channel.

6. The cavity insert of claim 1, wherein the mounting flange and the member are separately formed.

7. The cavity insert of claim 1, wherein the mounting flange and the member are integrally formed.

8. The cavity insert of claim 1, wherein the body, the mounting flange and the member are separately formed.

9. The cavity insert of claim 1, wherein the body, the mounting flange and the member are integrally formed.

10. The cavity insert of claim 1, wherein the mounting flange defines an interface for accepting, in use, a sealing member, the interface being positionable, in use, between the mounting flange and the external surface.

11. The cavity insert of claim 1, wherein the external surface defines an interface for accepting, in use, a sealing member, the interface being positionable, in use, between the mounting flange and the external surface.

12. The cavity insert of claim 1, wherein the member defines an interface for accepting, in use, a sealing member, the interface being positionable, in use, between the member and the cavity plate.

13. The cavity insert of claim 1, wherein the cavity plate defines an interface for accepting, in use, a sealing member, the interface being positionable, in use, between the member and the cavity plate.

14. The cavity insert of claim 1, wherein:
a first interface is defined between the external surface and the mounting flange, the first interface for accepting, in use, a sealing member; and
a second interface is defined between the member and the cavity plate, the second interface for accepting, in use, a sealing member.

15. The cavity insert of claim 1, wherein:
the member includes:
a notch configured to be coupled with a protrusion, complementary to the notch, the protrusion and the notch being configured to positively locate, in use, the cavity insert relative to the cavity plate.

16. The cavity insert of claim 15, wherein said notch is associated with a first configuration and the protrusion is associated with a second configuration; the first configuration and the second configuration being so selected such that the notch fits securely within, when in use.

17. A mold stack of a molding machine, the mold stack comprising:
a core assembly receivable, in use, in a core plate, the core assembly defining, in use, at least a core portion of a molding cavity;
a gate insert receivable, in use, within a cavity plate having a front face; the gate insert defining, in use, at least a gate portion of the molding cavity;
a neck ring located between the core assembly and a cavity insert, the neck ring configured to define, in use, a neck portion of the molding cavity; and
the cavity insert including:
a body having:
an internal surface defining, in use, at least a body portion of the molding cavity;
an external surface defining, in use, at least a first portion of a cooling channel configured, in use, to direct a flow of coolant; and
a mounting flange configured to support, in use, the body relative to the front face of the cavity plate, the mounting flange including:
a member configured to define, in use, a second portion of the cooling channel, the member further defining a rear mounting extremity, and wherein at least a portion of the first portion of the cooling channel, in use, projects beyond the rear mounting extremity.

18. The mold stack of claim 17, wherein:
said core assembly includes:
a core for defining, in use, the core portion of the molding cavity; and
a lock ring configured to support, in use, the core relative to the core plate.

19. The mold stack of claim 17, wherein the neck ring is implemented as a core lock type neck ring.

20. The mold stack of claim 17, wherein the neck ring is implemented as a cavity lock type neck ring.

21. The mold stack of claim 20, wherein the neck ring partially defines a support ledge portion of the molding cavity.

22. The mold stack of claim 17, wherein the mounting flange defines an interface for accepting, in use, a sealing member, the interface being positionable, in use, between the mounting flange and the external surface.

23. The mold stack of claim 17 wherein the external surface defines an interface for accepting, in use, a sealing member, the interface being positionable, in use, between the mounting flange and the external surface.

24. The mold stack of claim 17, wherein the member defines an interface for accepting, in use, a sealing member, the interface being positionable, in use, between the member and the cavity plate.

25. The mold stack of claim 17, wherein the cavity plate defines an interface for accepting, in use, a sealing member, the interface being positionable, in use, between the member and the cavity plate.

26. The mold stack of claim 17, wherein:
a first interface is defined between the external surface and the mounting flange, the first interface for accepting, in use, a sealing member; and
a second interface is defined between the member and the cavity plate, the second interface for accepting, in use, a sealing member.

27. The mold stack of claim 17 further comprising a positioning member for positively locating the cavity insert relative to the cavity plate.

* * * * *